(12) United States Patent
Day

(10) Patent No.: US 7,676,568 B2
(45) Date of Patent: Mar. 9, 2010

(54) CENTRALLY-CONTROLLED DISTRIBUTED MARKING OF CONTENT

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1766 days.

(21) Appl. No.: 10/795,474

(22) Filed: Mar. 8, 2004

(65) Prior Publication Data

US 2005/0198274 A1  Sep. 8, 2005

(51) Int. Cl.
G06F 15/173 (2006.01)
(52) U.S. Cl. ............... 709/224; 709/238; 709/223
(58) Field of Classification Search ............ None
See application file for complete search history.

(56) References Cited

U.S. PATENT DOCUMENTS

| | | | | |
|---|---|---|---|---|
| 6,928,442 | B2 * | 8/2005 | Farber et al. | 707/10 |
| 7,032,031 | B2 * | 4/2006 | Jungck et al. | 709/246 |
| 7,054,935 | B2 * | 5/2006 | Farber et al. | 709/226 |
| 7,240,100 | B1 * | 7/2007 | Wein et al. | 709/214 |
| 7,260,783 | B1 * | 8/2007 | Mika | 715/748 |
| 7,362,775 | B1 * | 4/2008 | Moskowitz | 370/468 |
| 2002/0059580 | A1 | 5/2002 | Kalker et al. | 725/25 |
| 2002/0141584 | A1 * | 10/2002 | Razdan et al. | 380/203 |
| 2003/0161265 | A1 * | 8/2003 | Cao et al. | 370/229 |
| 2003/0223367 | A1 | 12/2003 | Shay et al. | 370/231 |
| 2004/0205162 | A1 * | 10/2004 | Parikh | 709/219 |

FOREIGN PATENT DOCUMENTS

WO  1998/014858 A1  4/1998

OTHER PUBLICATIONS

The International Search Report for PCT/US2005/006508 filed on Mar. 3, 2005.
Farias, et al., May 11-15, 2003, "Video Quality Objective Metric Using Data Hiding", *IEEE International Conference on Communications, Anchorage, AL*, 5(5):464-467.
Dilley, et al., Sep.-Oct. 2002, Globally Distributed Content Delivery, *IEEE Internet Computing*, pp. 50-58.
Tanenbaum, 1996, "SNMP-Simple Network Management Protocol", *Computer Networks*, pp. 643-669.
J. Zhao; "A WWW Service To Embed and Prove Digital Copyright Watermarks," Proceedings of the European Conference on Multimedia Applications, Services and Techniques, Louvain-La-Neuve, Belgium; May 1996; All fifteen pages.

* cited by examiner

*Primary Examiner*—John B. Walsh
(74) *Attorney, Agent, or Firm*—BainwoodHuang

(57) ABSTRACT

Presently disclosed is a method and apparatus for monitoring and diagnosing a content delivery network (CDN) by examining received content elements that have been marked with one or more identifiers. Diagnosing is accomplished by using all or part of one or more of the identifiers associated with errored or corrupted content elements to determine which network elements or connection paths are faulty. The identifiers may contain content-, server-, or receiver-specific data that denotes, respectively, the source of the content, the links associated with one or more of the servers utilized in the network, and/or data associated with the receiving computer system. Both marking and diagnosing may be performed at any location within the CDN or at any host computer connected to the CDN or receiver. The marking may also be dynamically reconfigured in order to facilitate diagnosis.

25 Claims, 6 Drawing Sheets

CENTRALLY-CONTROLLED DISTRIBUTED MARKING OF CONTENT

BACKGROUND

A typical content delivery network (CDN) may include, among other things, a central server that is the collection point for digital works or "content," one or more distribution servers, and a collection of receivers. The receivers are typically the end-users of the content distribution network, such as individuals connected via the public Internet and personal Web browsers to the CDN who have paid for or have requested free content transmissions. The distribution servers provide a distributed organization and caching scheme for the content packets. This form of caching is often necessary in large-scale distribution operations in order to provide rapid (low latency) delivery of content packets to the receivers.

The central server may be, in some instances, a single host or a dedicated collection of host servers and storage units responsible for providing CDN management along with the repository of content. Alternatively, the coordination and management functions may be provided by an independent process operating on one or more network host elements. In still other systems, the central server may be merely one of many servers that can all act as content collection points as well as packet distribution points within the network.

It must be noted that "content," as used in this description, refers to all forms of digital media currently known or to be discovered, whether complete works or portions thereof. Examples include, but are not limited to, videos (e.g., MPEG files), still images (e.g., JPEG or TIFF files), voice and/or musical recordings (e.g., MP3 files), text files (e.g., ASCII or HTML files), Portable Document Format (PDF) files, and executables.

For a variety of purposes, it is sometimes useful to attach tags or markers to the content. These tags or markers are designed so that they are unobtrusive, even invisible to users, and minimally affect the "core use" of the content, but are available for detailed examination by persons or programs that choose to use them. These markers typically contain some kind of tracking information. Well-known examples are the "received" headers of conventional e-mail (described in, for example, Request For Comments [RFC]-821), various kinds of digital watermarks, and region codes on digital video disks (DVDs). (These marks are distinguished from the mechanisms of digital rights management (DRM) systems, which depend on some form of encryption to "lock" the content away as well as some form of key delivery to provide an "unlock" mechanism for the content.)

Tracing or tracking marks support a variety of different applications. One such application is to simply trace the actual path followed by a digital work that might have traversed any of a large number of paths. Another is to identify the point in time at which a work was requested or delivered. A mark can include information that is not easily constructed by another party, offering a weak kind of signature authentication facility. A mark may also provide information that is used by a facility of the recipient to determine which of a number of services might be available. In its crudest form, this latter use determines whether the content is playable or accessible by the recipient's computer.

In another application, marking may be performed by extending fields in previously tagged documents, such as HTML, XML, and related SGML-derived files. Such extensible mark-up languages (or formats) allow the addition of "nested" marks or tags, which are simply ignored by readers that are not looking for them.

In addition, other forms of watermarking or postmarking are also well known. Such uses include, for example, date- and time-stamps, copyright information, and even steganometric encryption of additional information within an image. Such devices are described, for example, in Bruce W. Schneier, *Applied Cryptography*, 2d ed. (1996) and J. Zhao, "A WWW Service To Embed And Prove Digital Copyright Watermarks," Proc. of the European Conference on Multimedia Applications, Services and Techniques, Louvain-La-Neuve, Belgium (May 1996), both incorporated herein by reference in their entireties.

SUMMARY

There are several deficiencies in the above-described conventional approaches. For example, in larger content distribution networks, the multitude of collection and content distribution servers as well as the large number of receivers can make troubleshooting content delivery problems very difficult; prior art route tracing information included in headers is generally inadequate for detailed network monitoring and diagnostic applications. For example, if a particular work or piece of content (such as a movie clip) should appear garbled at the receiver's computer, it may be difficult to tell whether the data errors were introduced at the receiver's computer, the receiver's media playback software, the distribution server, or the originating server. Errors may also be introduced in any of the linking paths between the aforementioned network elements.

In addition, certain applications are often concerned about leaks of valuable content from the CDN. While present watermarking schemes are commonly used to identify the source of leaked information, such systems are hampered by the fact that watermarks are static and unchanging. Additionally, all content within present CDNs is typically watermarked with the same information when watermarking is used. It is more desirable to be able to change watermarks periodically or depending on suspected information leaks.

What is needed is a method and apparatus for monitoring and/or diagnosing the status of a content delivery network that more readily indicates the source of errors or transmission failures and is more readily amenable to reconfiguration or re-purposing of the marking information.

In contrast to the previously-described conventional approaches, embodiments of the present invention are directed to monitoring and diagnosing a content delivery network by examining elements of received content that have been marked with one or more identifying data tags, referred to hereafter as "identifiers." Diagnosing is accomplished by using all or part of one or more of the identifiers associated with failed or corrupted content elements to determine which segments or connection paths within the network are faulty. Identifiers in successfully received content may also be used to evaluate performance of the CDN and thus to rule out problems in the delivery servers (i.e., diagnosis by process of elimination). The identifiers may contain content-, server-, or receiver-specific data that denotes, respectively, the source of the content, the links associated with one or more of the servers utilized in the network, and/or data associated with the receiving computer system (including its software). Receiver-specific data within the identifiers may also describe (for example) the operating system, the content rendering or playback software, or the programming environment in use.

Both marking and diagnosing may be performed at any location within the CDN, including (but not limited to) at the receiver, in any of the distribution servers, the central content repository (if provided) or at any content-sourcing host. Additionally, marking and/or diagnosing may be performed at any host computer connected to the CDN or receiver that has access to the content element while it is in route in the CDN.

A further embodiment includes a method and apparatus for content delivery networking comprising one or more network elements for marking each content element with one or more identifiers and for delivering the marked content elements over the network to one or more servers connected to the network. The marked content may then be further served to at least one receiver computer. Diagnosing and/or monitoring the network may be performed using all or a portion of the identifiers associated with a marked content element. Content element identifiers may include, but are not limited to, data reflecting the content, one or more of the servers or network paths used in the distribution of the content, and/or the receiver. In particular, diagnosing and/or monitoring may also comprise acquiring or otherwise reading the identifiers associated with the received content element and extracting some or all of the data within those identifiers. The extracted data may then be used to correlate the errored packet or content element with the network element causing the error, thus isolating the most likely source of that error.

In a further alternate embodiment, the content element marking may be adjusted or reconfigured (i.e., the data within the identifier(s) may be changed) in response to the correlation of the network transmission error with the marked content element. Such reconfiguring may be used to provide further diagnostic information or further identification of the type or location of the network, content, or receiver problem that caused the error or fault.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques and systems for the diagnosing and monitoring of network performance and configuration in content delivery networks. These embodiments include, but are not limited to, apparatus and methods of monitoring and diagnosing content distribution and delivery, computer systems for use in monitoring and diagnosing content distribution and delivery, and computer software embodied in a computer-readable medium storing an executable computer program or a computer data signal comprising computer instructions embodied in a carrier waves.

Figure 1:
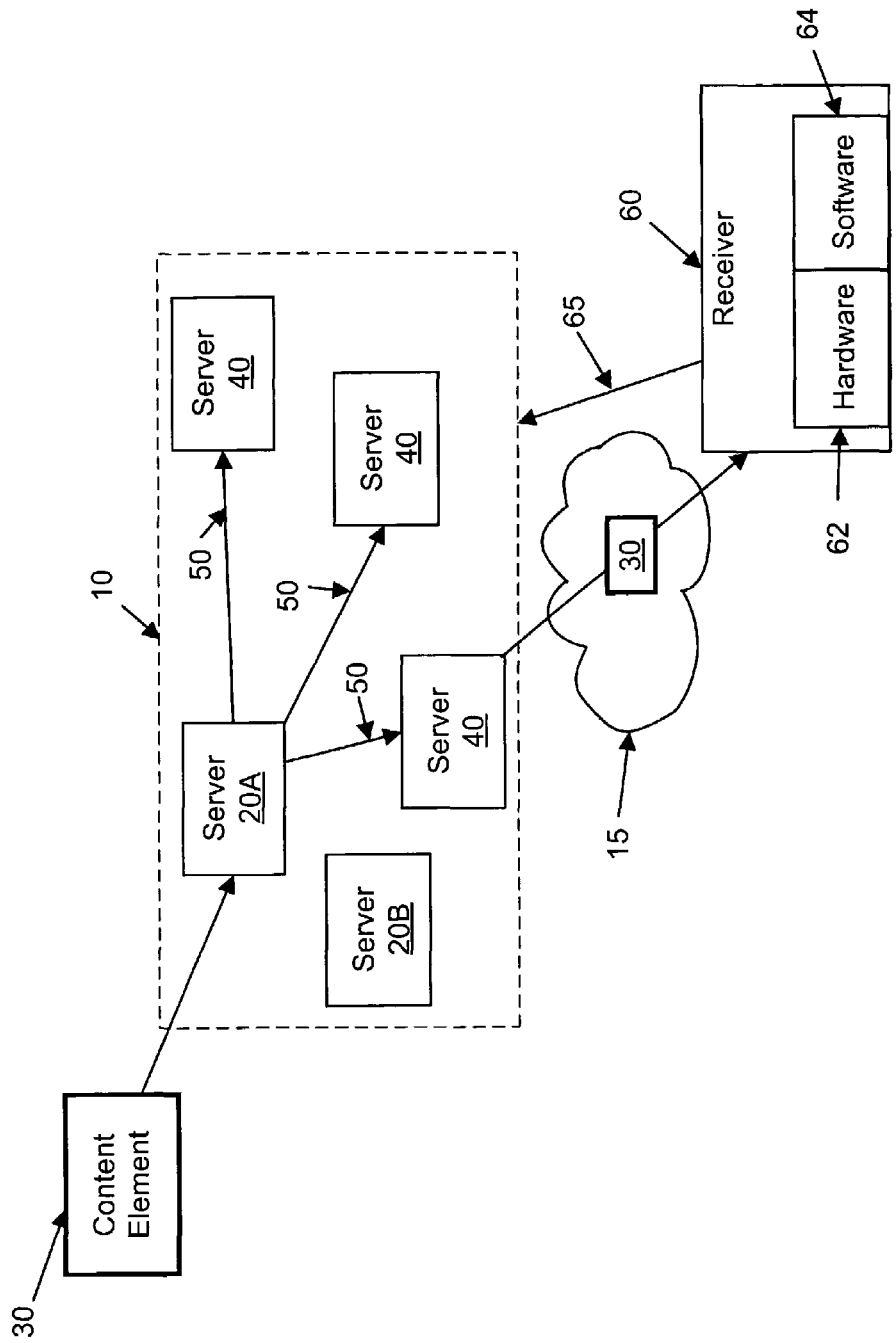
FIG. 1 is a high-level schematic representation of a prior art content delivery network.

FIG. 1 illustrates a content delivery network as known in the prior art. Content delivery network 10 consists of several servers 20 arranged in any of the network topologies known and currently used in the art today. In some instances, server 20A serves as a central content aggregator or repository; this function is also referred to as the central management point or the "content distribution manager" (CDM). Content is typically distributed in, for example, packets 30 are sent to distribution servers 40 by means of links 50. Distribution servers 40, in turn, deliver the content to one or more receivers 60. In some prior art systems, distribution servers 40 may form a hierarchy or tree of servers from a single root through multiple branches. Although multiple servers may be used to distribute content to an end-user, the CDN usually appears (to the end-user) as a single "super-server" providing content on request. It is this opacity (from the user's perspective) that makes troubleshooting CDN errors so difficult: the user cannot tell from a typical packet what occurred within the CDN 10. Described below (with reference to FIG. 2 et seq.) is an apparatus and method that overcomes this drawback by providing information associated with each piece of content that helps to describe the internal configuration and state of the CDN.

A receiver 60 may consist of hardware 62 (consisting of, for example, a personal computer, speakers, and a monitor) and software 64. Software 64 may further consist of a Web browser and other programs for multimedia playback software, such as the well-known QuickTime Player or Windows Media Player. (QuickTime is a trademark of Apple Computer, Inc. of Cupertino, Calif. and Windows Media is a trademark of Microsoft Corp., Redmond, Wash.)

In operation, a content packet 30, such as a portion of a music or movie file, may be received at central content server 20A. Content packet 30 may then be distributed from central content server 20A to distribution servers 40. This distribution is typically performed to provide mirrored or cached copies of content packet 30 at multiple locations with CDN 10. (Alternatively, the content may be "pulled" from the server, i.e., the distribution server may request content from the central server in response to a request from a receiver). Such caching or mirroring is well understood in the art as enabling more rapid delivery of the content to users, especially in broadly dispersed networks covering large geographic areas or in networks that experience high amounts of congestion.

The last distribution server 40 in the CDN, which serves content packet 30 to receiver 60, is also referred to as an edge server, since it sits (logically) on the edge of CDN 10.

Upon request 65 to CDN 10 from the end-user at receiver 60, content is delivered from a distribution server 40 to receiver 60, typically in packet form. Such request may be made in the form of ordering a movie on demand, downloading a music clip, or linking to a free webcast. It may also utilize (for example) public Internet 15 or any other well-known internetworking systems to connect to CDN 10.

Figure 2:
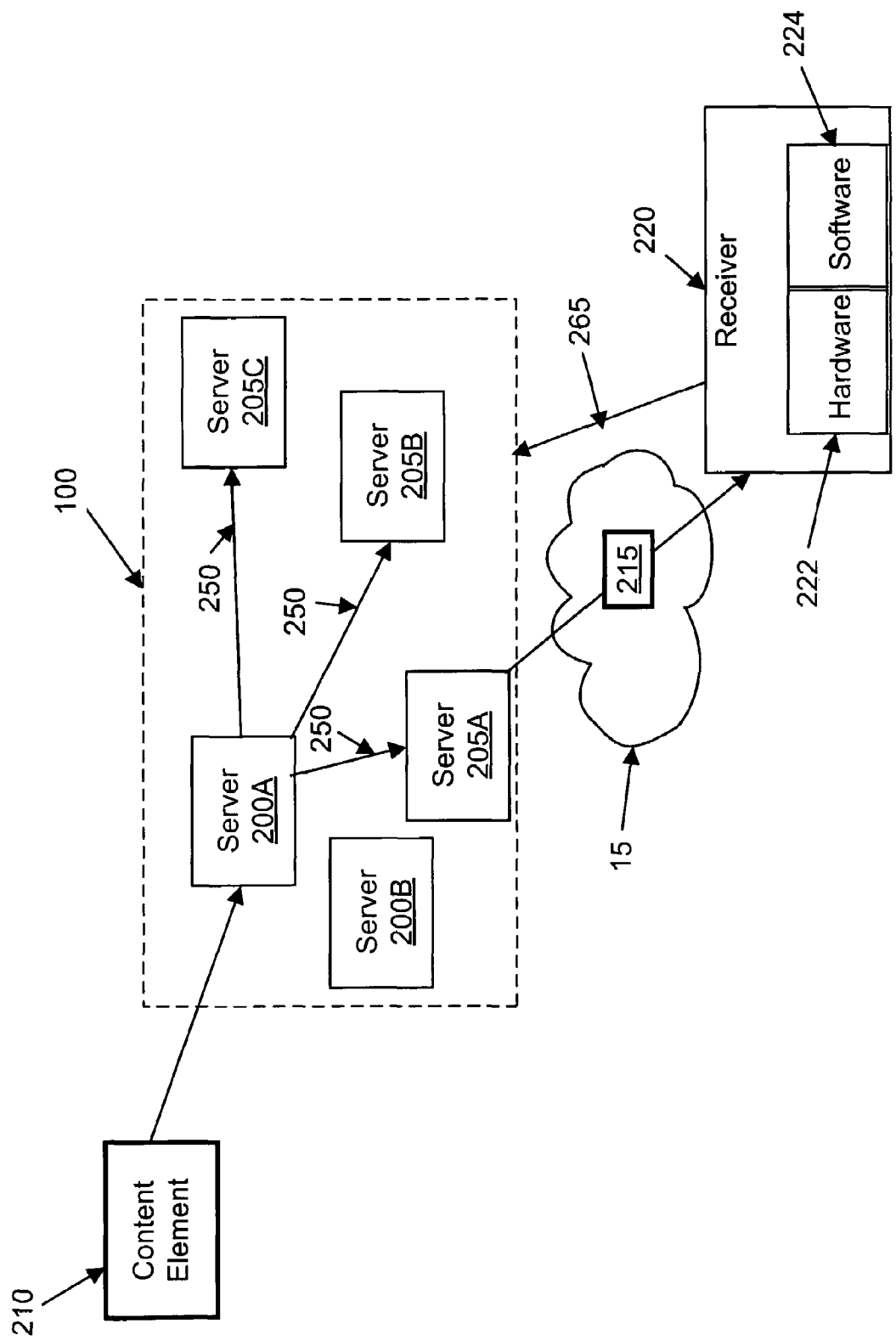
FIG. 2 is a high-level schematic representation of a content delivery network according to one embodiment of the present invention.

FIG. 2 illustrates one embodiment of a content delivery network constructed in accordance with the present teachings. Content delivery network (CDN) 100 consists at least in part of servers 200 and 205. Server 200A may, in some embodiments, be a central content repository. Alternatively, server 200A may simply be one of many servers 200 within CDN 100 capable of receiving content for subsequent distribution within the network, possibly (as noted above) arranged into a tree or other hierarchical structure and forming a virtual super-server for content distribution.

One of ordinary skill in the art will appreciate that servers 200 and 205 may be physically separate and distinct units or may be merely logical processes existing within one or a few physical devices. Accordingly, the present invention is not limited in its applicability to any single CDN server configuration, farm, or virtualization scheme (as those terms are understood in the art), but rather encompasses all possible CDN configurations. Furthermore, CDN 100 may consist of any of the computer networks currently known in the art or yet to be discovered, including but not limited to, the Internet, a metropolitan area network (MAN), a local area network (LAN), a private network or intranet, or any other interconnection of computer networking elements.

For illustrative clarity, a single server 200A is shown as receiving a content element 210. As used here, the term "content element" refers to an individual portion or fragment of the digital work as transmitted in any packetized or cellular form of digital network transmission. The "content element" is the fragment itself, the complete set of fragments make up the work of digital content. Such transmission forms include, but are not limited to TCP/IP packets, HDLC/SDLC frames and ATM cells. Accordingly, the present system is not limited in applicability to any particular type of network transmission scheme, protocol, or medium; rather, it may be employed with any transmission system.

Server 200A distributes content element 210 to distribution servers 205 via communications paths 250. In embodiments where there is no central content repository 200A, distribution servers 205 may be some or all of the other servers 200 on CDN 100 other than the one that initially received content element 210.

As shown in FIG. 2, content element 210 is copied (distributed) to distribution servers 205A, 205B, and 205C, however one of ordinary skill in the art will understand that distribution within CDN 100 may be accomplished using fewer or more distribution servers 205; only three such servers are shown here for illustrative clarity.

At some later point in time, the end-user (not shown) may request delivery from CDN 100 (and via conventional communications path 265) of a particular work of digital comment. As noted above, the requested content may be, for example, a movie or an audio file. The end-user may request content using receiver 220's computer hardware 222 and associated software 224, connected through (for example) the public Internet 15. Such request may be made through any conventional means used or known in the internetworking arts today or to be developed in the future. For example, the end-user may use a conventional operating system and Web browser (part of software 224 and commonly referred to a "client software") to select a particular movie from an online movie provider. Common Internet communication protocols would then convey the user's request through the public Internet 15 to the content delivery network 100 utilized by the online movie provider.

In one embodiment, the content requested by the user is marked with identifying information by some or all of the elements of CDN 100 (such as, although not limited to, servers 200 and 205) through which the content passes. These marks may be cumulative, in that each element of CDN 100 may add additional identifying data, or they may be sequential in that new elements may replace previously placed identifiers. For example, the identifier may consist of a list of all of the distribution servers through which the content element passed. Alternatively, the identifier may only include the address of the last server transited. It is not necessary to have marking performed by a central server or CDM; embodiments may include systems or schemes in which the identifiers are changed or added to by some or all of the content delivery network elements. Marking may be performed on each content element 210, only some of them, or only a single content element to form a marked content element 215. Marking at the content level (rather than at the content element level) need only attach identifier(s) to the work, as by nesting tags into a previously tagged work (e.g., an XML-compliant file) or by modifying the content itself (e.g., by watermarking or by changing a pre-existing watermark), rather than place identifiers on each content element.

Figure 3C:
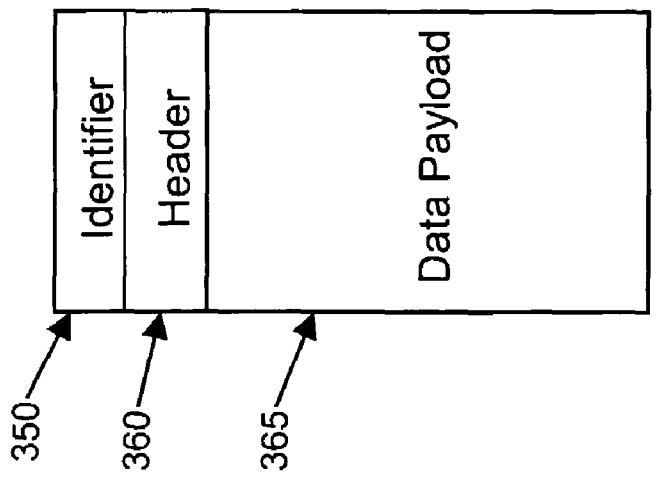
FIG. 3 is a high-level schematic representation of a marked content element according to one embodiment of the present invention.
Figure 3B:
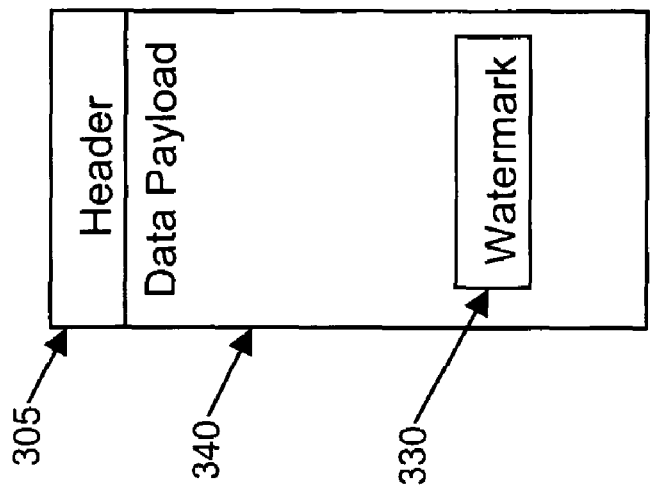
Figure 3A:
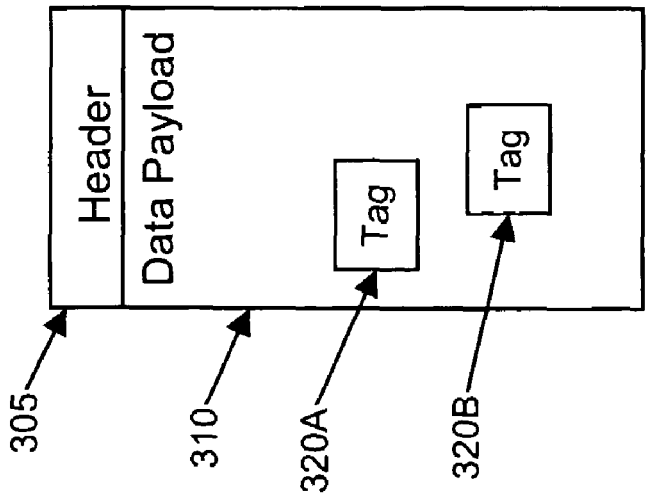

FIG. 3A illustrates one way in which identifier 320, in the form of tags 320A and 320B, may be embedded within a content element. Here, a content element, such as the well-known Internet Protocol (IP) packet used in a TCP/IP networking scheme, consists of a header 305 and a data payload 310. This content element is marked by inserting one or more tags 320 into data payload 310. As with conventional systems that change packet data payloads, the present system also recomputes and rewrites various fields in packet header 305, such as the checksum and byte count fields, to account for the insertion of tag(s) 320. (Note that, although two tags 320A and 320B are shown, any number of tags, from one to many, may be used, depending on the amount of information one wishes to attach to the content. Accordingly, the present system is not limited in the number of tags used; two are shown in FIG. 3A for reference only.)

FIG. 3B shows an alternate form of a marked content element. In this case, rather than adding identifiers as tags within the content element (as in FIG. 3A), when a non-tagged type of content (such as a video file) is used, a watermark or similar embedded mark may be applied to the entire content. In this situation, many, if not all, of the content elements comprising the work will contain watermark data 330 within the data payload portion 340 of each content element. The pieces of the watermark thus reside within the standard fields of data payload 340 in a manner that preserves the routing and content information for correct processing by both downstream and upstream devices, e.g., in both network and end-user/receiver devices. The addition of a watermark does not corrupt either the routing or the content information. In order to prevent tampering, in one arrangement, the watermark may be integrated with the routing and/or content information so extensively (as, for example, by using conventional copyright watermarking techniques) that it is difficult or even impossible to delete.

FIG. 3C illustrates a schematic representation of a further alternate way in which a content element may be marked with an identifier 350. Header 360 and data payload 365 represent a conventional packet containing at least a portion of the content. Identifier 350 may be used to mark the entire content element. One of ordinary skill in the art will appreciate that, although identifier 350 is illustrated as prepended to the header 360, identifier 350 may be appended as well, or even split between the beginning and the end of the data payload 365. Alternatively, more than one identifier 360 may be used.

Identifiers 320, 330, and/or 350 (as used in the various alternative marking approaches discussed above) may consist, in some embodiments, of data indicating the source of the content. Such data is referred to as "content-specific" data. Alternatively, an identifier may consist of server-specific data or receiver-specific data, either alone or in combination with each other or with additional content-specific data. Such data may take any form that aids a content delivery network administrator, technician, or other troubleshooter to ascertain the network elements that processed, distributed, or otherwise routed the content element in question. In particular, an identifier may include (as content-specific data) the original source of content, copyright information, license information, and/or timestamp information. As to server-specific information, an identifier may include information on the central repository server, one or more of the distribution servers, and/or routing information describing the network path (or "hops") by which content element was routed to the receiver. As to receiver-specific information, an identifier may include data describing the identity or credentials of the end-user or his or her computer, the receiver's software and/or hardware configuration, or the routing used in the network to convey the content element from the last distribution server to the receiver's computer system.

In particular, content-specific information may include such elements as a digital signature authenticating the validity of the content element, a watermark or postmark, copyright information, proprietary rights legends, or other indicia of ownership. Server-specific information may include such common elements as the source address, the destination address, or the MAC address associated with a particular server.

Figure 4:
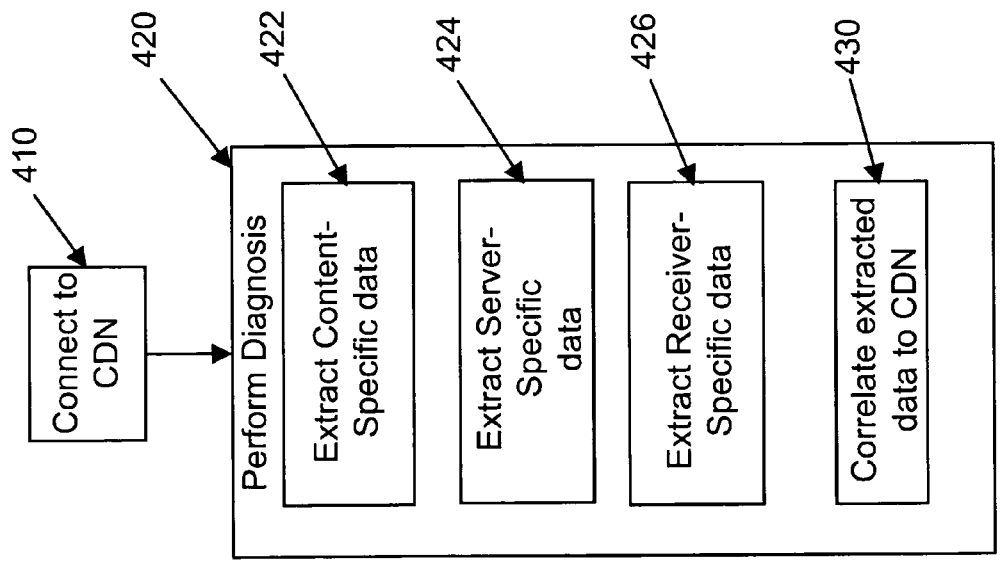
FIG. 4 is a flowchart of a content delivery network diagnosing process according to one embodiment of the present invention.

FIG. 4 is a flowchart of the process by which one embodiment of the present invention may operate. The system first connects 410 to a content delivery network, which provides a plurality of content elements each marked with one or more identifiers. These identifiers may include content-, server-, or receiver-specific data, or some combination thereof. Note that, in typical operation, there is no explicit connection step or action required to use a CDN; the servers are always connected to the network. Step 410 is shown only for clarity, to represent the initial state of the process, i.e., the state of connectedness.

For each instance in which a damaged or otherwise errored content element or packet of a content element is detected, diagnosis 420 may be performed on the content delivery network. Diagnosis 420 is performed, in some embodiments, using all or portion of the identifiers associated with the errored content element (or content element packet, i.e., a packet containing a portion of a content element). For example, if a receiver consistently receives bad packets, the receiving end-user may diagnose the CDN, and in particular the network connection to the receiver, by examining the identifiers associated with received packets and extracting the data indicating the last distribution server that provided the content element to the receiver (e.g., as represented by block 424). Alternatively, the end-user may perform a similar diagnosis by using the portion of the identifier data that describes the routing path to the receiver and/or the expected receiver configuration (i.e., some or all of the receiver-specific data, block 426). Alternatively, the end-user may forward the received content element (for example, by e-mail) to a "help desk" or analogous technical expert for troubleshooting. In the latter case, the help desk would typically be able to bring to bear its knowledge of the CDN and end-user (receiver) configuration to better understand the problem and the diagnostic information contained within the identifier.

Another common type of problem to be diagnosed in step 420 is a slow, rather than failed, connection. In such a case, diagnosis 420 may include evaluating server performance in the distribution chain in order to eliminate servers that are working correctly from further troubleshooting. Alternately, diagnosis 420 may include checking configuration and/or policy settings in the distribution servers.

In a further embodiment, diagnosing step 420 may be performed by extracting and using content-specific information (block 422) stored within the marked content element to identify the source of content, its required playback configuration, or other information descriptive of the ultimate delivery requirements for that type of content. Diagnosing step 420 may also be performed by extracting and using server-specific information (block 424) stored within the marked content element. Such server-specific information, which could identify, for example, the servers and/or pathways by which the content element was routed, is useful for identifying potentially bad routes or congested network elements that may be causing errors or lost transmissions.

The extracted data may be further used by correlating it (in block 430) with known information about the content elements, the CDN, and/or the receiver in order to ascertain which network elements or components are causing the reported problems or to determine system status. Such comparison and correlation may be performed using conventional network management devices, databases, and other management tools.

The present invention may also utilize more than one type of path-specific information, such as but not limited to those described above, to perform CDN diagnosis, where the term "diagnosis" is understood to include within its scope performance monitoring, content path tracing/evaluation, and network data gathering. Accordingly, one of ordinary skill in the art will recognize that the present invention is not limited to particular types or classifications of identifiers, but rather encompasses all types of network element and network path identifying data useful in diagnosing content delivery networking problems.

Figure 5:
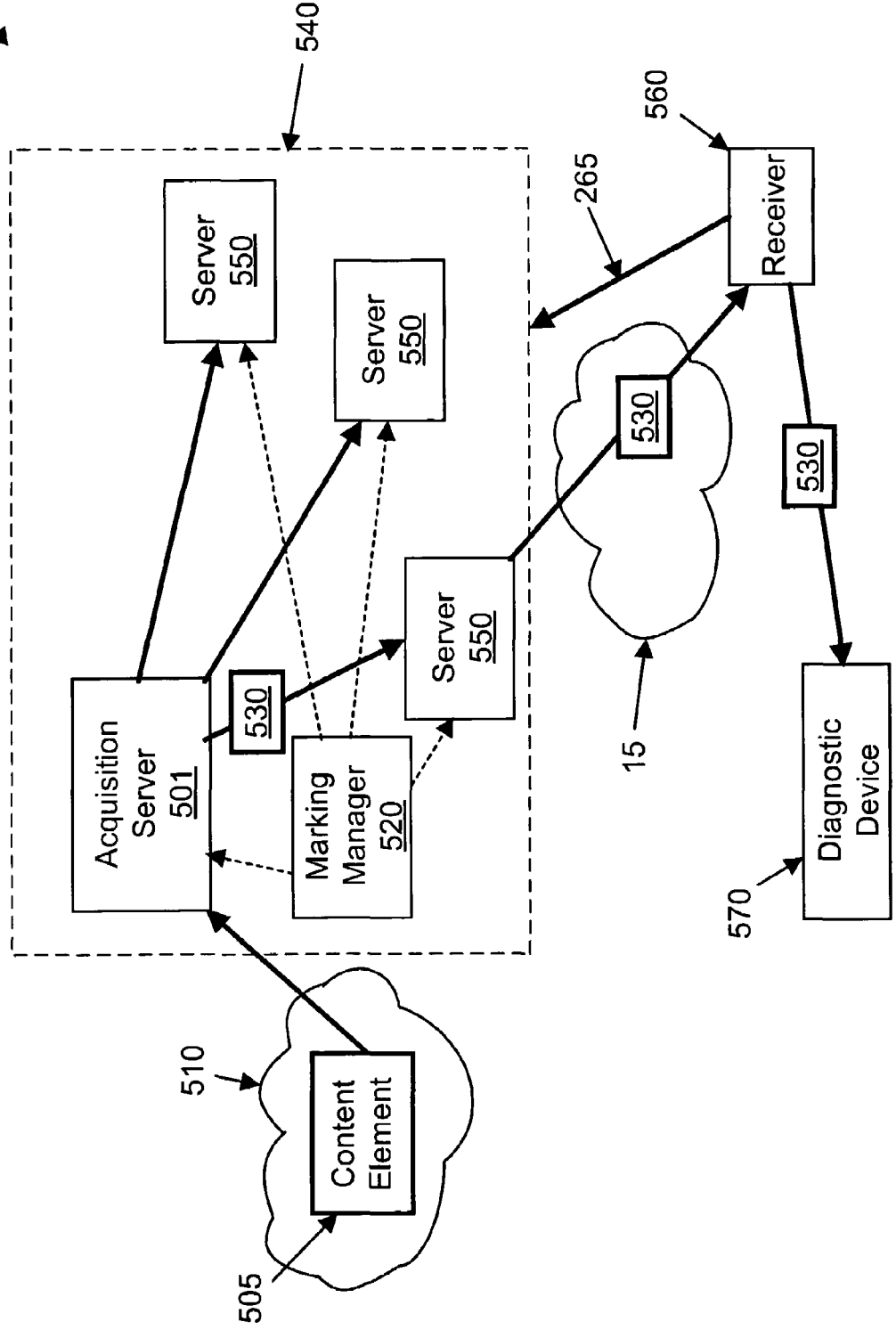
FIG. 5 is a high-level schematic representation of a content delivery network according to an alternate embodiment of the present invention.

In a further alternative embodiment, illustrated in FIG. 5, a system 500 for content delivery networking with enhanced diagnostic capabilities may comprise software and/or hardware means 501 for acquiring a content element 505 from a network 510 (such as the Internet or a private storage network), software and/or hardware means 520 for marking that content element with one or more identifiers, and means for delivering the marked content elements 530 over the CDN 540 to one or more other servers 550 and at least one receiver 560. Additionally included within system 500 are diagnostic hardware and/or software 570 that use at least a portion of the identifiers associated with each marked content element 530 to diagnose CDN 540 or its delivery of marked content element 530.

In some embodiments of the content delivery networking system 500 described above, the means for acquiring the content element 510 and means for delivering the marked content element 530 over CDN 540 (e.g., servers 501 and 550) may comprise conventional networking hardware and/or software elements. Likewise, marking manager 520 may also be conventionally implemented in either hardware or software well known to those of ordinary skill in the art.

Diagnostic device 570 may comprise hardware and/or software for acquiring or otherwise reading and/or parsing received (and marked) content element 530 from the receiver. It may also include hardware and/or software for extracting at least a portion of the identifiers from within the received content element 530 and hardware and/or software for correlating the extracted identifier data with the elements of CDN 540 involved in delivering marked content element 530 to receiver 560.

Figure 6:
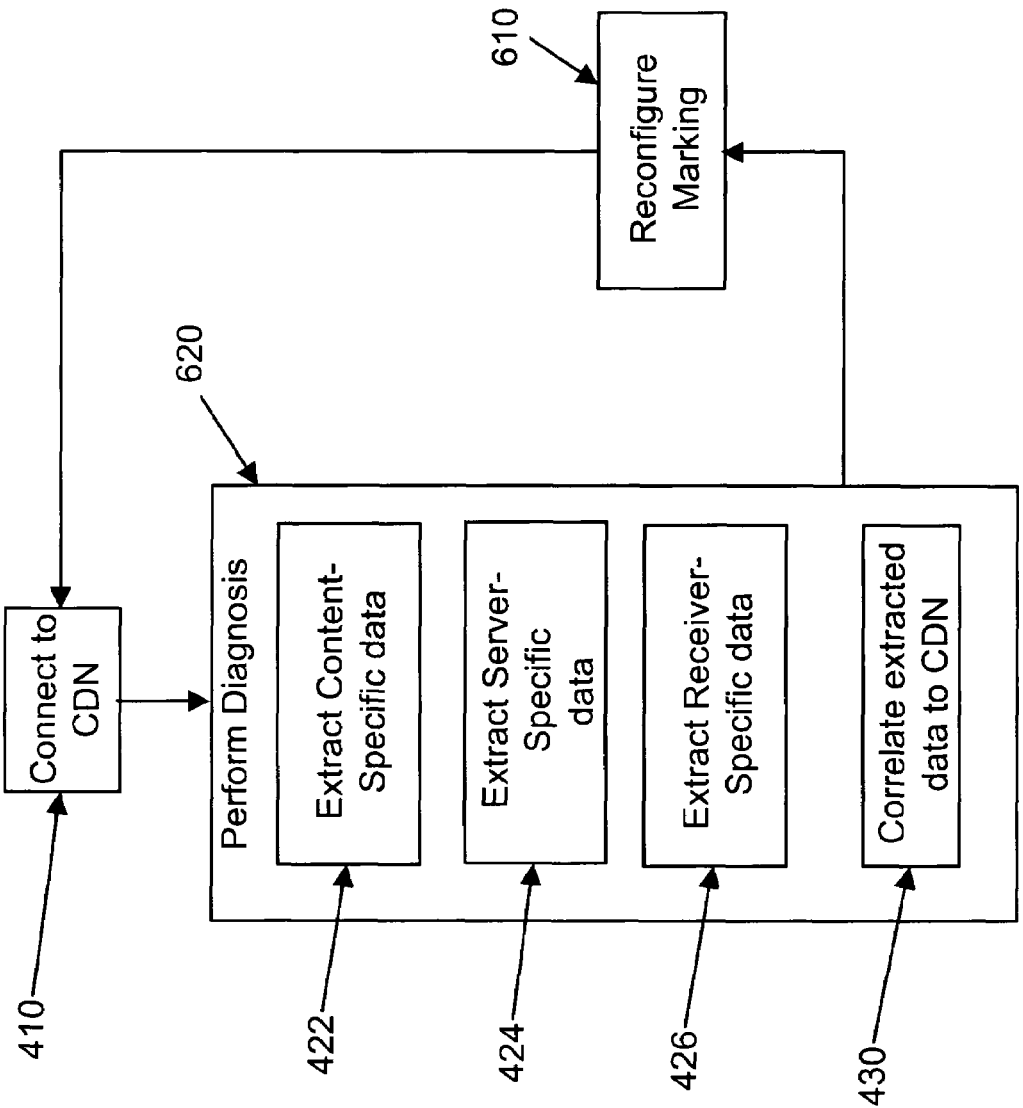
FIG. 6 is a flowchart of a content delivery networking process according to an alternate embodiment of the present invention.

In a further alternate embodiment, illustrated in FIG. 6, the process whereby monitoring and diagnosis of a CDN is performed may also include a reconfiguring step 610. In reconfiguring step 610, diagnosis step 620 may cause future markings to be changed to reflect a need (discovered in diagnosis step 620) for additional information on network performance, topology, configuration, policies, and/or connectivity. For example, if a content element were marked with only data that identified the last distribution server, and if diagnosis step 620 determined that, although the last distribution server was not at fault but a prior server was, diagnosis step 620 could instruct (in block 630) the marking element (for example, marking manager 520 of FIG. 5) to include in subsequent markings additional routing data that describes the routing path prior to the last distribution server.

In all embodiments, marking, monitoring, and/or diagnosing may be performed at any location within the network, including (but not limited to) at the receiver, in any of the distribution servers, or at the central content repository. Additionally, marking, monitoring, and/or diagnosing may be performed at any host computer connected to the network that is configured to have access to the content while in route in the CDN. Such configuring may be accomplished by conventional means well-known in the art and, accordingly, is not further discussed here.

The marking and diagnosing capabilities discussed above may also be extended to use in the digital rights management (DRM) arena. In such an application, part of the identifiers associated with each content element may include an authorization or other cryptographically secure information that would enable authentication of the receiver prior to delivery or otherwise prevent the unauthorized delivery of content element. Digital rights management schemes are generally well known in the art; the present system provides additional utility not previously identified in that it can be configured and/or reconfigured to support routing path-based authentication prior to content delivery.

While this invention has been particularly shown and described with references to preferred embodiments thereof, it will be understood by those skilled in the art that various changes in form and details may be made without departing from the spirit and scope of the invention as defined by the appended claims.

I claim:

1. In a data communications device configured to perform data communications operations within a network, a method for conveying information between an upstream device of the network and a downstream device of the network, the method comprising:

receiving, from the upstream device, an initial content element having routing information and content information;

generating a marked content element from the initial content element; and sending, to the downstream device, the marked content element in place of the initial content element based on the routing information, the marked content element having the routing information and the content information of the initial content element, the marked content element further having mark information which:

(i) preserves the routing information of the marked content element to enable delivery of the marked element to the downstream device;

(ii) preserves the content information of the marked content element to enable correct content processing of the content information by the downstream device; and (iii) defines a characteristic of the network to enable diagnosis of network behavior.

2. The method of claim 1, wherein said generating the marked content element comprises associating content-specific data with said content element.

3. The method of claim 1, wherein said generating the marked content element comprises associating server-specific data with said content element.

4. The method of claim 1, wherein said generating the marked content element comprises associating receiver-specific data with said content element.

5. The method of claim 1, wherein sending the marked content element includes providing, as the mark information of the marked content element, an identifier which uniquely identifies the data communications device among multiple data communications devices.

6. The method of claim 1, wherein generating the marked content element includes overlaying the mark information on at least a portion of the content information in an embedded watermarking manner to maintain integrity of the content information while including the mark information in-band with the routing information and the content information.

7. The method of claim 1, wherein generating the marked content element includes overlaying the mark information on the content information in an embedded watermarking manner, the content information being integrated with previously overlaid mark information to provide the marked content element with mark information from multiple sources.

8. The method of claim 1 wherein receiving, from the upstream device, the initial content element having routing information and content information includes receiving the initial content element having content information, the content information including at least a portion of a digital media file as a payload of the initial content element.

9. The method of claim 8 wherein the digital media file is a video file.

10. The method of claim 8 wherein the digital media file is an image file.

11. The method of claim 8 wherein the digital media file is a still image file.

12. The method of claim 8 wherein the digital media file is a text file.

13. The method of claim 8 wherein the digital media file is a Portable Document Format file.

14. The method of claim 8 wherein the digital media file is an executable file.

15. The method of claim 8 wherein the initial content element is received from the upstream device in response to the upstream device receiving a request from a downstream device for the digital media file.

16. In a computer, a method for diagnosing network behavior, the method comprising:

receiving a marked content element from a network, the marked content element having routing information, content information, and mark information, the routing information and the content information originating from an initial content element, the mark information being subsequently added to the routing and content information in a manner that:

(i) preserves the routing information to enable downstream delivery of the marked element;

(ii) preserves the content information of the marked content element to enable correct content processing of the content information; and (iii) defines a characteristic of the network;

extracting the mark information from the marked content element; and providing, using a microprocessor of the computer, an analysis of the network based on the extracted mark information.

17. A method as in claim 16 wherein providing the analysis of the network based on the extracted mark information includes:
- determining whether a last distribution server of the network was at fault in handling the marked content element;
- if the last distribution server was not at fault in handling the marked content element, then sending a signal to the network indicating that routing data should be included within mark information for subsequently sent marked content elements; and
- if the last distribution server was at fault in handling the marked content element, then sending a signal to the network indicating that the last distribution server malfunctioned.

18. A method as in claim 16 wherein the content information of the marked content element includes at least a portion of a digital media file as a payload.

19. A method as in claim 18 wherein the digital media file is a video file.

20. In a data communications device configured to perform data communications operations within a network, a method of content delivery networking, comprising:
- acquiring a content element from a network;
- marking said content element with one or more identifiers to form a marked content element;
- delivering said marked content element over said network to one or more servers on said network;
- serving said marked content from at least one said server to at least one receiver to form received content; and
- diagnosing said network using at least one of said one or more identifiers;

wherein:
- said network comprises a plurality of network elements; and
- said diagnosing further comprises:
  - acquiring said received content element from said receiver;
  - extracting the one or more identifiers from said received content to form an extracted identifier;
  - correlating at least part of said extracted identifier with one or more of said network elements; and
  - reconfiguring said one or more identifiers in response to said correlating.

21. The method of claim 20, wherein said marking further comprises associating content-specific data with said content element.

22. The method of claim 20, wherein said marking further comprises associating server-specific data with said content element.

23. The method of claim 20, wherein said marking further comprises associating receiver-specific data with said content element.

24. The method of claim 20 wherein the content information of the marked content element includes at least a portion of a digital media file as a payload.

25. The method of claim 20 wherein the digital media file is a video file.

* * * * *